(12) United States Patent
Wagner et al.

(10) Patent No.: US 10,862,084 B2
(45) Date of Patent: Dec. 8, 2020

(54) BATTERY MODULE HAVING A PLURALITY OF BATTERY CELLS, METHOD FOR THE PRODUCTION THEREOF, AND BATTERY

(71) Applicant: Robert Bosch GmbH, Stuttgart (DE)

(72) Inventors: Christian Wagner, Kaiserslautern (DE); Daniel Bernd Greiner, Tuebingen (DE); Matthias Riedmann, Winnenden (DE); Peter Kohn, Stuttgart (DE); Robert Hafenbrak, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 16/074,027

(22) PCT Filed: Jan. 4, 2017

(86) PCT No.: PCT/EP2017/050126
§ 371 (c)(1),
(2) Date: Jul. 30, 2018

(87) PCT Pub. No.: WO2017/133859
PCT Pub. Date: Aug. 10, 2017

(65) Prior Publication Data
US 2019/0044115 A1   Feb. 7, 2019

(30) Foreign Application Priority Data

Feb. 3, 2016  (DE) .................. 10 2016 201 604

(51) Int. Cl.
*H01M 2/10*     (2006.01)
*H01M 10/04*    (2006.01)
(Continued)

(52) U.S. Cl.
CPC ....... *H01M 2/1077* (2013.01); *H01M 2/1061* (2013.01); *H01M 10/04* (2013.01);
(Continued)

(58) Field of Classification Search
CPC ............ H01M 2/0177; H01M 2/1061; H01M 10/0481; H01M 10/04; H01M 10/647; H01M 10/0525; H01M 2/1077
See application file for complete search history.

(56) References Cited

U.S. PATENT DOCUMENTS

2004/0201366 A1 * 10/2004 Kimoto ............. H01M 10/6557
                                              320/150
2005/0158625 A1 *  7/2005 Im ..................... H01M 4/5825
                                              429/231.1
(Continued)

FOREIGN PATENT DOCUMENTS

CN       1783541 A    6/2006
CN     100580991 C    1/2010
(Continued)

OTHER PUBLICATIONS

International Search Report with English translation and Written Opinion for Application No. PCT/EP2017/050126 dated Mar. 10, 2017 (12 pages).

*Primary Examiner* — Ula C Ruddock
*Assistant Examiner* — Matthew W Van Oudenaren
(74) *Attorney, Agent, or Firm* — Michael Best & Friedrich LLP

(57) ABSTRACT

The invention relates to a battery module having a plurality of battery cells, in particular lithium ion battery cells, comprising a plurality of separating walls (3), wherein a battery cell (2) is arranged between two separating walls (3) and a first compensating element (7) is arranged between a first battery cell (2) and a separating wall (3) adjacent to the first battery cell (2) and a second compensating element (7) is arranged between a second battery cell (2) and a separating wall (3) adjacent to the second battery cell (2), charac-
(Continued)

terized in that the first compensating element (7) and the second compensating element (7) have a different value (9) of a deformation constant.

21 Claims, 1 Drawing Sheet

(51) Int. Cl.
*H01M 10/0525* (2010.01)
*H01M 10/647* (2014.01)

(52) U.S. Cl.
CPC ... *H01M 10/0481* (2013.01); *H01M 10/0525* (2013.01); *H01M 10/647* (2015.04)

(56) References Cited

U.S. PATENT DOCUMENTS

| | | | |
|---|---|---|---|
| 2006/0093899 A1* | 5/2006 | Jeon | H01M 2/1072 429/99 |
| 2011/0293982 A1* | 12/2011 | Martz | H01M 10/6557 429/120 |
| 2012/0112393 A1* | 5/2012 | Januma | F16F 3/023 267/103 |
| 2013/0130086 A1 | 5/2013 | Schaefer | |

FOREIGN PATENT DOCUMENTS

| | | |
|---|---|---|
| DE | 102013021331 A1 | 6/2015 |
| JP | 200048867 A | 2/2000 |
| JP | 2013004294 A | 1/2013 |
| JP | 2014192094 A | 10/2014 |
| WO | 2010016771 A1 | 2/2010 |

* cited by examiner

BATTERY MODULE HAVING A PLURALITY OF BATTERY CELLS, METHOD FOR THE PRODUCTION THEREOF, AND BATTERY

BACKGROUND OF THE INVENTION

The invention relates to a battery module having a plurality of battery cells and a method for producing said battery module. A battery having such a battery module is also subject matter of the present invention.

It is known from the prior art that batteries, such as in particular lithium ion batteries, comprise at least one battery module or advantageously also comprise a plurality of battery modules. Furthermore, it is preferred that a battery module comprises in addition a multiplicity of individual battery cells that are connected to one another to form the battery module. The individual battery cells may be connected to one another in series or in parallel.

Aging processes as a result of charging and discharging procedures in the individual battery cells produce internal forces that not only result in the individual battery cells not remaining in a constant shape for the duration of their serviceable life but also these processes, which are described as bulging, deform the housing of the battery cells. Consequently, these processes require that the battery module is configured in such a manner that it is able to absorb the internal forces that arise as a result of the aging processes and is able to delimit the deformation of the housing of the individual battery cells. The procedure of influencing the individual battery cells or their housing with a force in order to delimit the deformation is generally referred to as a process of applying surface pressure. The rate at which the individual battery cells age is determined in particular by means of the force that is produced in order to press against the battery cells, wherein the rate of aging increases in technically-relevant operating regions as the surface pressure increases.

Furthermore the individual battery cells become warm during the operation as a result of their internal resistance during the flow of electrical current. The battery cells of a battery module comprise an inhomogeneous temperature distribution, wherein battery cells in the middle of a battery module are at a higher temperature as a result of the less efficient possibility of dissipating heat in comparison to the battery cells that are located on the edge of a battery module. The rate of aging of the individual battery cells is in particular also determined by means of their temperature, wherein the rate of aging increases as the temperature increases. Since battery cells that have a comparatively higher temperature age more rapidly, a battery module having an inhomogeneous temperature distribution also comprises an inhomogeneous distribution of the rate of ageing, which can lead to the fact that the serviceable life of the entire battery module is reduced since the serviceable life of a battery module is determined by means of the battery cell which ages the most rapidly.

It is known from the prior art, in particular from US 2014/0023893, that battery cells are arranged between two partition walls, wherein the individual partition walls comprise elastic elements for determining the elasticity of an individual partition wall.

Furthermore, it is known from US 2013/0252063 to configure partition walls, which are arranged between two battery cells, in such a manner that these regions have different degrees of elasticity in order to be able to counteract the deformation of the battery cells.

SUMMARY OF THE INVENTION

The battery module having a plurality of battery cells and the method for producing said battery module have the advantage that the force pressing against a first battery cell and a second battery cell may be different. The force that is pressing against an individual battery cell may be adjusted by means of the value of a deformation constant of a compensating element. As a consequence, it is possible to influence the rate of aging of individual battery cells via the force that is produced in order to provide the surface pressure. In particular, it is possible by means of a different surface pressure to compensate for different rates of aging as a result of different temperatures of the individual battery cells, as a result of which it is possible to equalize the states of aging of the individual battery cells overall.

In accordance with the invention, a battery module having a plurality of battery cells is provided, wherein the battery cells are in particular lithium ion battery cells. The battery module comprises a plurality of partition walls, wherein a battery cell is arranged between two partition walls. A first compensating element is arranged between a first battery cell and a partition wall that is adjacent to the first battery cell. Furthermore, a second compensating element is arranged between a second battery cell and a partition wall that is adjacent to the second battery cell. The first compensating element and the second compensating element comprise a different value of a deformation constant.

It is of advantage if the compensating element that is arranged between a battery cell and a partition wall is configured in such a manner that the value of a deformation constant is constant over the entire compensating element. In particular, this is understood to mean that the compensating element does not have any regions that have different deformation resistances. Furthermore, it is naturally also possible that the compensating element comprises regions that have different deformation resistances in order to take into consideration in particular the expansion behavior of the individual battery cells that generally expand to a greater extent in a middle region of a side face.

It is expedient that two partition walls are connected to one another by a bracing element in such a manner that a force for pressing against a battery cell that is arranged between the two partition walls is transmitted from the two partition walls to the battery cell. Furthermore, it is also expedient that the battery module forms at least one receiving chamber that comprises two partition walls. The two partition walls of a receiving chamber for the battery cell are connected to one another by means of at least a further housing wall. It is preferred that the receiving chamber for the battery cell is configured in such a manner that said receiving chamber comprises in addition to the two partition walls also two side walls and a base as a result of which it is possible to install the battery cell in the receiving chamber via the remaining opening, wherein it is preferred that the remaining opening may be closed by means of a cover element in order to close the receiving chamber with respect to an environment. Both when the connection is provided by means of a bracing element and also in the case of a configuration as part of a receiving chamber, the partition walls that have a battery cell arranged between two partition walls are arranged spaced apart from one another by a spacing that preferably remains constant.

The constant spacing that results in particular from the two partition walls being connected to one another ensures that it is possible to transmit from the two partition walls a force for pressing against the battery cell. The expansion processes that occur when the battery cell is being charged or discharged produce forces that are directed from the battery cell respectively in particular in the direction of the two partition walls and said forces attempt to increase the size of the spacing between two partition walls. Since the spacing that is created as a result of the two partition walls being connected to one another is constant or only at least in part variable, it is consequently possible to produce forces from the partition walls that counteract the forces that are associated with the expansion, as a result of which the forces eventually press against the battery cell. Since a compensating element is arranged at least between the battery cell and one of the partition walls that is adjacent to the battery cell, the forces that are associated with the expansion processes of the battery cell also deform the compensating element, which as a result generates a force that counteracts the deformation, said force consequently also counteracting the expansion of the battery cell. The force that is required to deform the compensating element is dependent upon the value of the deformation constants of the compensating element. It is consequently possible to influence the surface pressure by means of the value of the deformation constants. In other words, the greater the value of the deformation constants of the compensating element, the greater is the force required in order to deform said compensating element and that consequently an even greater force presses against the battery cell.

It is expedient if two adjacent partition walls are arranged adjacent to one another side-by-side respectively with their largest side faces in a longitudinal direction of the battery module and are arranged spaced apart from one another by means of a spacing. The battery cells that are arranged respectively between two partition walls are preferably configured in a prismatic manner and furthermore are arranged adjacent to one another side-by-side with their largest side faces in the longitudinal direction of the battery module. As a consequence, it is possible to provide a reliable surface pressure against the battery cells since the partition walls are arranged with their largest side faces adjacent to the largest side faces of the battery cells and consequently it is ensured that the surface pressures are reliably transmitted for applying a surface pressure.

It is of advantage if the deformation constant is a spring constant, an elastic modulus, a surface pressure modulus or a viscosity value. Furthermore, it is also possible that the deformation constant describes a geometric variable. By way of example, the geometric variable may be an elongated extension of the compensating element in the longitudinal direction of the battery module. Expressed in other words, this means that the geometric variable describes the spacing between the particular side face of the compensating element that is configured so as to contact the battery cell and the particular side face of the compensating element that is configured so as to contact the partition wall. One possibility of realizing an increase in the longitudinal extension of the compensating element in longitudinal direction of the battery module is by way of example also the arrangement of multiple, in particular two, compensating elements rather than only one compensating element.

It is preferred that the battery module comprises a plurality of compensating elements that are arranged respectively between a partition wall and a battery cell, wherein it is preferred that only one compensating element is arranged between a partition wall and a battery cell, however, as described above, it is also possible in order to change the value of the deformation constants to arrange multiple compensating elements, which have in particular respectively different deformation constants, between a partition wall and a battery cell.

It is particularly advantageous if preferably at least one compensating element is arranged respectively both between the battery cell and one of the two partition walls between which the battery cell is arranged and also between the battery cell and the other partition wall of the two partition walls between which the battery cell is arranged, wherein it is preferred that the two compensating elements that are thus adjacent to the battery cell have the same value of a deformation constant. Furthermore, however, it is also possible that said compensating elements have a different value of a deformation constant. It is preferred that at least one compensating element is arranged respectively between a partition wall and a battery cell with the result that each battery cell is in contact with two compensating elements.

Furthermore, the battery module comprises in a longitudinal direction a first region and a second region. The battery module is configured in such a manner that the values of the deformation constants of the compensating elements reduce in the first region in the longitudinal direction of the battery module and/or increase in the second region in the longitudinal direction of the battery module. As a consequence, the force that presses against the individual battery cells that are arranged side-by-side in the longitudinal direction of the battery module reduces in the first region in the longitudinal direction of the battery module. Furthermore, the force that presses against the individual battery cells that are arranged side-by-side in the longitudinal direction of the battery module increases in the second region in the longitudinal direction of the battery module. Since the rate at which the battery cells age is dependent upon the surface pressure, it is consequently possible to distribute the rate of aging in an inhomogeneous manner in relation to the surface pressure. The battery module comprises in the longitudinal direction a first end and a second end, wherein the term 'first end or second end' is to describe respectively a battery cell that is located on the outer edge of the battery module. Furthermore, the battery module comprises in the longitudinal direction a middle position which is located in particular precisely in the middle between the first end and the second end. It is preferred that the first region includes the region between the first end and the middle position of the battery module and the second region includes the region between the middle position and the second end of the battery module.

The first region and the second region are expediently adjusted in such a manner that during the operation the temperature of the individual battery cells increases in the first region in the longitudinal direction and/or reduces in the second region in the longitudinal direction. As a consequence, the aging states of the individual battery cells may be distributed in a homogenous manner, the reason being that the battery cells that are at a higher temperature are subjected to a lower surface pressure than battery cells that are at a comparatively lower temperature thereto. It is consequently possible using an inhomogeneous surface pressure, which is associated with different deformation constants of the compensating elements, to compensate for the inhomogeneous rate of aging that occurs in particular as a result of the different possibilities of dissipating heat, said rate of aging being caused by an inhomogeneous temperature distribution.

Moreover, the invention relates to a battery having an above-described battery module.

In accordance with the invention, a method for producing an above-described battery module is also provided. In a first step, a temperature which a battery cell is to have during the operation of the battery module is determined for each battery cell. The temperature may be determined both by means of experimental tests and also by means of computer simulations. Furthermore, it is also possible to determine this temperature distribution during the operation. In particular, it is possible to use as a first approximation the fact that battery cells in the middle of the battery module are at a higher temperature than battery cells at the edge of the battery module, wherein FIG. 2 illustrates in an exemplary manner a temperature progression of the battery cells over the longitudinal direction of the battery module.

In a second step, the compensating elements are arranged in the battery module in such a manner that one compensating element has a lower value of a deformation constant in comparison to a compensating element that is preceding in the longitudinal direction of the battery module if the determined temperature of a battery cell that is arranged between the same two partition walls as the compensating element is higher than the temperature of a battery cell that is arranged between the same two partition walls as the preceding compensating element.

Furthermore, in the second step, the compensating elements are arranged in the battery module in such a manner that one compensating element has a higher value of a deformation constant in comparison to a compensating element that is preceding in the longitudinal direction of the battery module if the determined temperature of a battery cell that is arranged between the same two partition walls as the compensating element is lower than the temperature of a battery cell that between the same two partition walls may the preceding compensating element.

As a consequence, it is possible using an inhomogeneous distribution of the surface pressure to compensate at least in part for an inhomogeneous rate of aging of the battery cells that is associated with an inhomogeneous temperature distribution.

BRIEF DESCRIPTION OF THE DRAWINGS

Exemplary embodiments of the invention are illustrated in the drawings and further explained in the following description.

In the drawing.

DETAILED DESCRIPTION

Figure 1:
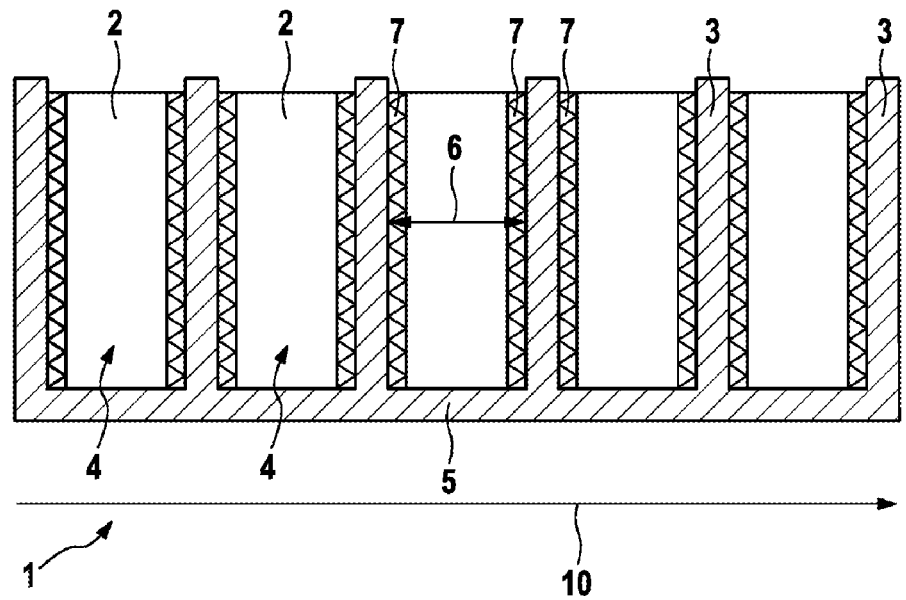
FIG. 1 illustrates schematically a side view of an embodiment of a battery module in accordance with the invention and FIG. 2 illustrates in an exemplary manner a temperature progression of the battery cells during the operation and a progression of the values of the deformation constants of the compensating elements over the longitudinal direction of the battery module.

FIG. 1 illustrates schematically a side view of an embodiment of a battery module 1 in accordance with the invention.

The battery module 1 comprises a plurality of battery cells 2, wherein the battery module 1 illustrated in FIG. 1 comprises in particular five battery cells 2. Furthermore, the battery module 1 also comprises a plurality of partition walls 3 that, as is apparent in FIG. 1, are arranged between respectively two battery cells 2. As a consequence, a partition wall 3 is adjacent to two battery cells 2. The battery module 1 comprises furthermore two end-side partition walls 3 that may also be described as end plates. The end-side partition walls 3 or end plates are arranged respectively only adjacent to a battery cell 2 and therefore also, as is apparent in FIG. 1, are not arranged between respective two battery cells 2.

In the case of the battery module 1 that is illustrated in FIG. 1, the battery module 1 forms a plurality of receiving chambers 4, wherein one of the receiving chambers 4 comprises in each case two partition walls 3. Furthermore, the battery module 1 comprises a base 5 and two side walls that are not illustrated in FIG. 1 and are arranged respectively preferably at a right angle with respect to the two partition walls 2 and the base 5. The base 5 together with the two side walls and respective two partition walls 3 form a receiving chamber 4. It is preferred that the base 5, the side walls not illustrated in the figure and the two partition walls 3 form a plurality of receiving chambers 4 that are unable to deform in such a manner that said receiving chambers are not able to deform during the operation of the battery module 1 as a result of the forces that are associated with an expansion of the battery cells 2. As a consequence, a spacing 6 remains also constant between the two partition walls 3 during the operation.

It is to be noted at this point that a partition wall 3 is consequently involved in forming two receiving chambers 4. Only the end-side partition walls 3 or end plates are involved in forming only one partition chamber 4.

FIG. 1 shows furthermore that a battery cell 2 is arranged between two partition walls 3. In particular, one battery cell 2 is received in a receiving chamber 4. It is preferred that the battery cells 2 and the partition walls 3 are arranged in an alternating manner, wherein it is also quite possible to receive more than one battery cell 2 in a receiving chamber 4 with the result that in the case of the alternating arrangement one partition wall 3 always follows a battery cell 2.

At least, one compensating element 7 is arranged between a battery cell 2 and a partition wall 3 that is adjacent to this battery cell 2. It is preferred that a compensating element 7 is arranged respectively between a battery cell 2 and the two partition walls 3 that are adjacent to this battery cell 2. In the case of the exemplary embodiment of a battery module 1 illustrated in FIG. 1, a battery cell 2 is consequently arranged between two compensating elements 7 and is in direct contact with said compensating elements. Furthermore, the compensating elements 7 are arranged on the side face remote from the battery cell 2 respectively in particular in direct contact with the respective partition walls 3.

Procedures performed to charge and discharge the battery cells 2 during the operation of the battery module 1 produce expansion processes which lead to forces that act on the partition walls 3 in the opposite direction to the battery cell 2. Since the receiving chambers 4 are configured in such a manner that they retain a constant shape during the operation, it is possible for the partition walls 3 to counteract the deformation and thus to transmit a surface pressure. Since still further compensating elements 7 are arranged between the partition walls 3 and the battery cells 2, the expansion processes also cause the compensating element 7 to deform, wherein a deformation constant of the compensating element 7 determines the deformation resistance thereof and consequently also the force that counteracts the expansion and consequently finally the surface pressure.

Figure 2:
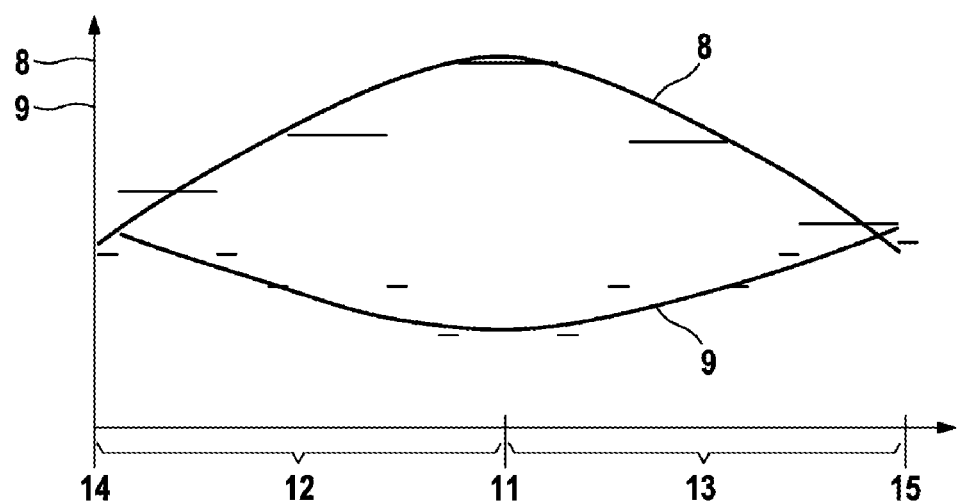

FIG. 2 illustrates in an exemplary manner a temperature progression of the battery cells 2 over the longitudinal direction of the battery module 1, said longitudinal direction being described by the reference numeral 10. In addition, the temperature 8 of the individual battery cells 2 of the battery module 1 that is illustrated in FIG. 1 is represented over the longitudinal direction 10 of said battery module. It is apparent that battery cells 2 in a middle position have a higher temperature 8 than battery cells 2 on the edge of the battery module 10. This is a result of the less efficient possibilities of dissipating the heat and the more intense warming by means of adjacent battery cells 2. Approximately, it is possible for the illustrated progression of the temperature 8 to assume a parabolic character, wherein the peak lies in a middle position 11 of the longitudinal direction 10 of the battery module 1.

The inhomogeneous temperature distribution of a battery module 1 as illustrated by means of the temperature progression in FIG. 2 also produces an inhomogeneous distribution of the rate of ageing of the battery cells 2 which contributes to the battery cells 2 that are at a higher temperature 8 aging more rapidly. This inhomogeneous distribution of the rate of aging caused by the temperature is to be counteracted by adjusting the values of the deformation constants of the compensating elements 7. Since the battery cells 2 age more rapidly as the surface pressure increases, the battery cells 2 that are at a higher temperature 8 are to be subjected to a lower surface pressure than battery cells that are at a comparatively lower temperature 8 in comparison thereto. Consequently, the rate of aging may be distributed in a homogenous manner.

FIG. 2 illustrates in addition furthermore in an exemplary manner a distribution of the values 9 of the deformation constants of the compensating elements 7. In addition, the value 9 of the deformation constants of the compensating elements 7 are represented for the battery module 1 that is illustrated in FIG. 1 over the longitudinal direction 10 of the battery module 1. The longitudinal direction 10 of the battery module 1 comprises a first region 12 that preferably includes the region from one end 14 of the battery module 1 to the middle position 11. As illustrated in FIG. 2, the temperature 8 of the individual battery cells 2 increases in the longitudinal direction 10 of the battery module in the first region 12 from one end 14 to the middle position 11, wherein, in order to achieve a homogeneous distribution of the aging states, the surface pressure that is to act on the individual battery cells 2 is to be reduced in the first region 12 in the illustrated longitudinal direction 10. The deformation constants of the compensating elements 7 are therefore adjusted in the first region 12 to the temperature progression in such a manner that the values 9 of the deformation constants reduce in the first region 12 in the illustrated longitudinal direction 10. Furthermore, the longitudinal direction 10 of the battery module 1 comprises a second region 13 that includes the region from the middle position 11 to another end 15 of the battery module 1. As illustrated in FIG. 2, the temperature 8 of the individual battery cells 2 reduces in the longitudinal direction 10 from the middle position 11 to the other end 15, wherein, in order to achieve a homogeneous distribution of the aging states, the surface force that is to act on the individual battery cells 2 is to increase in the second region 13 in the illustrated longitudinal direction 10. The deformation constants of the compensating elements 7 are therefore adjusted in the second region 13 to the temperature progression in such a manner that the values 9 of the deformation constants increase in the second region 13 in the illustrated longitudinal direction 10.

It is apparent that the values 9 are preferably identical for the deformation constants of compensating elements 7 that are arranged in contact with the same battery cell 2.

The invention claimed is:

1. A battery module having a plurality of battery cells including a first battery cell and a second battery cell, the battery module comprising a plurality of partition walls (3), wherein each of the plurality of battery cells (2) is arranged between a respective two of the partition walls (3), a first compensating element (7) is arranged between the first battery cell (2) and one of the partition walls (3) that is adjacent to the first battery cell (2), and a second compensating element (7) is arranged between the second battery cell (2) and one of the partition walls (3) that is adjacent to the second battery cell (2), characterized in that prior to initial operation of the battery module, the first compensating element (7) and the second compensating element (7) comprise a different value (9) of a deformation constant.

2. The battery module as claimed in claim 1, wherein the first and second compensating elements (7) are configured in such a manner that the value (9) of a deformation constant is constant over the entire first and second compensating elements (7).

3. The battery module as claimed in claim 1, characterized in that two of the partition walls (3) are connected to one another by a bracing element in such a manner that a force for pressing against a first battery cell (2) that is arranged between the two of the partition walls (3) is transmitted from the two of the partition walls (3) to the first battery cell (2).

4. The battery module as claimed in claim 1, wherein two of the partition walls (3) are arranged adjacent to one another with their largest side faces respectively in a longitudinal direction (10) of the battery module (1) and are spaced apart from one another by a spacing (6), wherein the plurality of battery cells (2) are arranged adjacent to one another side-by-side with their largest side faces in a longitudinal direction (10) of the battery module (1) and are configured respectively in a prismatic manner.

5. The battery module as claimed in claim 1, characterized in that the deformation constant is a spring constant.

6. The battery module as claimed in claim 1, wherein the battery module (1) comprises a plurality of compensating elements (7), wherein the battery module (1) comprises in a longitudinal direction (10) a first region (12) and a second region (13), characterized in that the values (9) of the deformation constants of the compensating elements (7) reduce in the first region (12) in the longitudinal direction (10) of the battery module (1) and/or increase in the second region (13) in the longitudinal direction (10) of the battery module (1).

7. The battery module as claimed in claim 6, characterized in that during operation the values (8) of the temperature of the battery cells (2) increase in the first region (12) and/or reduce in the second region (13).

8. A battery having a battery module as claimed in claim 1.

9. A method for producing a battery module as claimed in claim 1,
wherein in a first step a value (8) of a temperature of a battery cell (2) is determined for the operation of the battery cell (1), and
in a second step compensating elements (7) are arranged in the battery module (1) in such a manner that one compensating element (7) has a lower value (9) of a deformation constant in comparison to a compensating element (7) that is preceding in a longitudinal direction (10) of the battery module (1) if the determined temperature of a battery cell (2) that is arranged between the same two partition walls (3) as the compensating element (7) is higher than the temperature of a battery cell (2) that is arranged between the same two partition walls (3) as the preceding compensating element.

10. A method for producing a battery module as claimed in claim 1,
wherein in a first step a value (8) of a temperature of a battery cell (2) is determined for the operation of the battery cell (1), and
in a second step compensating elements (7) are arranged in the battery module (1) in such a manner that a compensating element (7) has a higher value (9) of a deformation constant in comparison to a compensating element (7) that is preceding in a longitudinal direction (10) of the battery module (1) if the determined temperature of a battery cell (2) that is arranged between the same two partition walls (3) as the compensating element (7) is lower than the temperature of a battery cell (2) that is arranged between the same two partition walls (3) as the preceding compensating element (7).

11. The method according to claim 10 wherein in the second step compensating elements (7) are arranged in the battery module (1) in such a manner that one compensating element (7) has a lower value (9) of a deformation constant in comparison to a compensating element (7) that is preceding in a longitudinal direction (10) of the battery module (1) if the determined temperature of a battery cell (2) that is arranged between the same two partition walls (3) as the compensating element (7) is higher than the temperature of a battery cell (2) that is arranged between the same two partition walls (3) as the preceding compensating element.

12. The battery module as claimed in claim 1, characterized in that the battery module (1) forms at least one receiving chamber (4) that comprises two partition walls (3), wherein the two partition walls (3) of a receiving chamber (4) for the battery cells (2) are connected to one another by means of at least a further housing wall (5).

13. The battery module as claimed in claim 1, wherein the plurality of partition walls (3) are fixed relative to each other.

14. The battery module as claimed in claim 1, wherein the second battery cell is in a center of the battery module, and wherein the value of the deformation constant of the second compensating element is lower than compensating elements adjacent any of the plurality of battery cells other than the second battery cell.

15. The battery module as claimed in claim 1, wherein the second battery cell is nearer to a center of the battery module than the first battery cell, and wherein the value of the deformation constant of the second compensating element is lower than the value of the deformation constant of the first compensating element.

16. The battery module as claimed in claim 1, wherein the deformation constant is an elastic modulus.

17. The battery module as claimed in claim 1, wherein the deformation constant is a surface pressure modulus.

18. The battery module as claimed in claim 1, wherein the deformation constant is a viscosity value.

19. The battery module as claimed in claim 1, wherein the deformation constant is a geometric variable.

20. The battery module as claimed in claim 1, wherein a third compensating element (7) is arranged between the first battery cell (2) and another one of the partition walls (3) that is adjacent to the first battery cell (2), and a fourth compensating element (7) is arranged between the second battery cell (2) and another one of the partition walls (3) that is adjacent to the second battery cell (2) and wherein prior to initial operation of the battery module, the first compensating element (7) and the third compensating element (7) have a same value (9) of the deformation constant and the second compensating element (7) and the fourth compensating element (7) have a same value (9) of the deformation constant.

21. A battery module having a plurality of battery cells including a first battery cell and a second battery cell, the battery module comprising a plurality of partition walls (3), wherein each of the plurality of battery cells (2) is arranged between a respective two of the partition walls (3), and a first spring element (7) is arranged between the first battery cell (2) and one of the partition walls (3) that is adjacent to the first battery cell (2), and a second spring element (7) is arranged between the second battery cell (2) and one of the partition walls (3) that is adjacent to the second battery cell (2), wherein prior to initial operation of the battery module, the first spring element (7) and the second spring element (7) have a different value (9) of a spring constant.

* * * * *